US008272755B2

(12) United States Patent
Oketani et al.

(10) Patent No.: US 8,272,755 B2
(45) Date of Patent: *Sep. 25, 2012

(54) SHOWCASE

(75) Inventors: Tetsuya Oketani, Ota (JP); Atsushi Todoroki, Gyoda (JP); Yoichi Amari, Ota (JP); Sakumi Shibusawa, Ota (JP)

(73) Assignee: Sanyo Electric Co., Ltd., Moriguchi-Shi (JP)

( * ) Notice: Subject to any disclaimer, the term of this patent is extended or adjusted under 35 U.S.C. 154(b) by 708 days.

This patent is subject to a terminal disclaimer.

(21) Appl. No.: 12/274,607

(22) Filed: Nov. 20, 2008

(65) Prior Publication Data

US 2009/0134802 A1 May 28, 2009

(30) Foreign Application Priority Data

Nov. 22, 2007 (JP) ................................. 2007-303582

(51) Int. Cl.
*F25D 27/00* (2006.01)
*A47F 11/10* (2006.01)

(52) U.S. Cl. ........................... 362/125; 362/92; 362/276

(58) Field of Classification Search .................... 362/92, 362/125, 276; 312/116; 340/815.45
See application file for complete search history.

(56) References Cited

U.S. PATENT DOCUMENTS

| | | | |
|---|---|---|---|
| 4,225,808 A * | 9/1980 | Saraceni | 315/307 |
| 5,136,213 A * | 8/1992 | Sacchetti | 315/159 |
| 5,733,038 A | 3/1998 | Wang | 362/394 |
| 6,255,747 B1 * | 7/2001 | Ramirez et al. | 307/119 |
| 6,722,142 B1 | 4/2004 | Pagel | 62/131 |
| 7,121,675 B2 * | 10/2006 | Ter-Hovhannisian | 362/92 |
| 7,321,120 B1 * | 1/2008 | Gorman et al. | 250/338.1 |
| 7,391,337 B2 * | 6/2008 | St-Germain | 340/686.1 |
| 7,862,195 B2 * | 1/2011 | Stack et al. | 362/125 |
| 2005/0253533 A1 * | 11/2005 | Lys et al. | 315/224 |
| 2005/0265019 A1 | 12/2005 | Sommers et al. | 362/217 |
| 2006/0176697 A1 * | 8/2006 | Arruda | 362/276 |
| 2007/0171647 A1 | 7/2007 | Artwohl et al. | 362/276 |

FOREIGN PATENT DOCUMENTS

| | | |
|---|---|---|
| JP | 8-224150 | 9/1996 |
| JP | 2546302 | 5/1997 |
| KR | 100756449 B1 | 8/2007 |
| WO | WO 03/005132 | 1/2003 |
| WO | WO 2008/064179 | 5/2008 |

OTHER PUBLICATIONS

European Search Report corresponding to EPC Application No. 08020197.3-1258 dated Dec. 8, 2010.

* cited by examiner

*Primary Examiner* — Peggy A. Neils
(74) *Attorney, Agent, or Firm* — Kratz, Quintos & Hanson, LLP

(57) ABSTRACT

An object is to provide a showcase in which appropriate illumination can be realized by an LED illumination apparatus having a high durability against turning ON/OFF and capable of securing a predetermined illumination intensity even under an environment at a low temperature. The showcase in which the inside of a display chamber configured to display commodities is illuminated by an LED illumination apparatus includes a person detecting sensor which detects the approaching of any person, and a control apparatus which adjusts the illumination intensity of the LED illumination apparatus, and the control apparatus gradually increases the illumination intensity of the LED illumination apparatus in a case where the person detecting sensor detects the approaching of the person.

4 Claims, 7 Drawing Sheets

FIG. 2

FIG. 3
FIG. 4
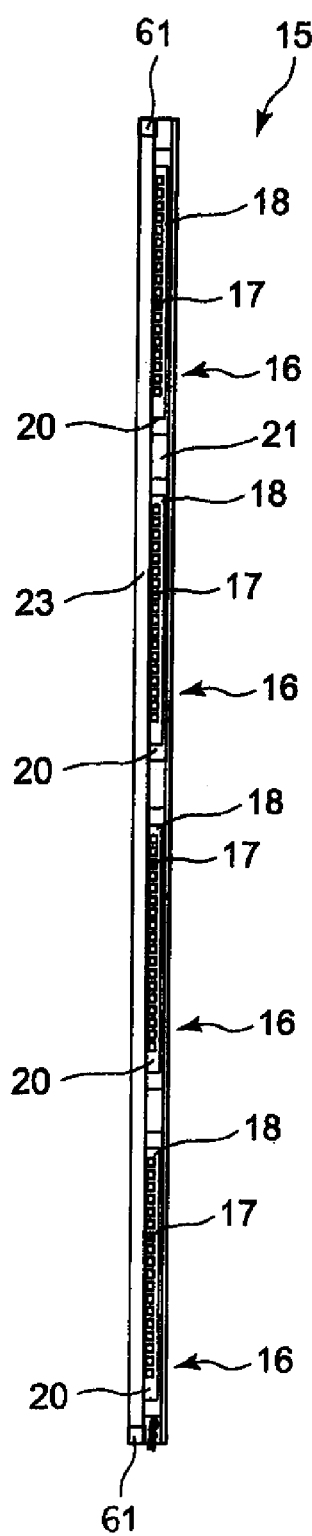
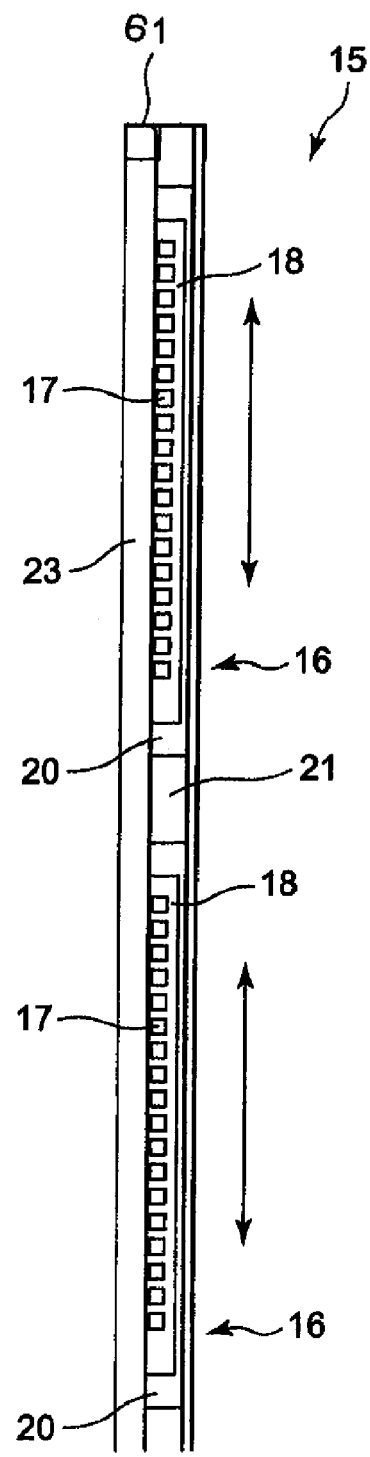

SHOWCASE

BACKGROUND OF THE INVENTION

The present invention relates to a showcase in which the inside of a display chamber for displaying commodities is illuminated by an LED illumination apparatus.

Heretofore, in a showcase which displays commodities in a display chamber and which is provided with illumination apparatuses for illuminating the commodities, fluorescent lamps have been used as the illumination apparatuses (e.g., see Patent Document 1). Pillars are vertically provided in the center of the edge of a front-surface opening or on both sides of the opening edge in a vertical direction, and the fluorescent lamps are attached to the rear surfaces of the pillars to illuminate the inside of the display chamber from the front side (e.g., Japanese Patent Application Laid-Open No. 8-224150 (Patent Document 1) and Japanese Utility Model Registration No. 2546302 (Patent Document 2)).

The above-mentioned fluorescent lamps are forced to be subjected to a replacement operation owing to luminance lowering or lighting defect due to aged deterioration. Therefore, a user is forced to perform the replacement operation of the fluorescent lamps, which causes a problem that the operation becomes laborious. A new fluorescent lamp for replacement needs to be constantly stored, and a storage place for the fluorescent lamp needs to be secured. Furthermore, the fluorescent lamp contains mercury, and hence there has been a problem that the used fluorescent lamp cannot easily be discarded.

Moreover, illumination apparatuses such as the fluorescent lamps or LED elements are lit to generate heat themselves. In a case where the showcase is used while the inside of the display chamber is cooled by a cooling apparatus, when the illumination apparatuses are provided in the display chamber, there is a problem that the cooling efficiency of the cooling apparatus is lowered by the illumination apparatuses generating the heat when lit.

To solve the problem, it is considered that the turning ON/OFF or the illumination intensity of each illumination apparatus be adjusted, depending on whether or not a customer is present. However, since the display chamber as a cooling space has a low temperature, each heretofore used fluorescent lamp requires a certain degree of time for realizing a predetermined illumination intensity immediately after the lamp is turned on, and there is a problem in effectively illuminating the commodities. Moreover, the fluorescent lamp is frequently turned on/off, which causes a problem that the life of the lamp itself shortens.

SUMMARY OF THE INVENTION

The present invention has been developed to solve a conventional technical problem, and an object thereof is to provide a showcase in which appropriate illumination can be realized by an LED illumination apparatus having a high durability against turning ON/OFF and capable of securing a predetermined illumination intensity even under an environment at a low temperature.

According to the invention of a first aspect, there is provided a showcase in which the inside of a display chamber configured to display commodities is illuminated by an LED illumination apparatus, characterized by comprising: a person detecting sensor which detects the approaching of any person; and control means for adjusting the illumination intensity of the LED illumination apparatus, wherein the control means gradually increases the illumination intensity of the LED illumination apparatus in a case where the person detecting sensor detects the approaching of the person.

According to the invention of a second aspect, there is provided a showcase in which the inside of a display chamber configured to display commodities is illuminated by an LED illumination apparatus, characterized by comprising: a person detecting sensor which detects the approaching of any person; an illumination intensity sensor which detects the brightness of a surrounding area; and control means for adjusting the illumination intensity of the LED illumination apparatus, wherein the control means determines the maximum illumination intensity of the LED illumination apparatus in accordance with the brightness of the surrounding area detected by the illumination intensity sensor, and increases the illumination intensity of the LED illumination apparatus to the maximum illumination intensity in a case where the person detecting sensor detects the approaching of the person.

A showcase of the invention of a third aspect is characterized in that in the above inventions, the person detecting sensor includes a power source of the person detecting sensor itself, a contact which detects the approaching of the person to open/close, a power source terminal connected to the power source, and two contact terminals connected to both sides of the contact, the showcase further comprising: a terminal plate to which the respective terminals are detachably connected.

According to the invention of a fourth aspect, there is provided a showcase in which the inside of a display chamber configured to display commodities is illuminated by an LED illumination apparatus, characterized by comprising: a glass door which openably closes an opening of the display chamber; door opening/closing detection means for detecting the opening/closing of the glass door; and control means for adjusting the illumination intensity of the LED illumination apparatus, wherein the control means decreases the illumination intensity of the LED illumination apparatus in a case where the door opening/closing detection means detects that the glass door has been opened.

According to the invention of a fifth aspect, there is provided a showcase in which the inside of a display chamber configured to display commodities is illuminated by an LED illumination apparatus, characterized by comprising: control means for adjusting the illumination intensity of the LED illumination apparatus, wherein the control means performs the dark/bright control of the illumination intensity of the LED illumination apparatus for a predetermined period.

According to the invention of a sixth aspect, there is provided a showcase in which the inside of a display chamber configured to display commodities while cooling the commodities is illuminated by an LED illumination apparatus, characterized by comprising: a temperature sensor which detects a temperature in the display chamber; and control means for adjusting the illumination intensity of the LED illumination apparatus, wherein the control means decreases the illumination intensity of the LED illumination apparatus in a case where the temperature sensor detects that the temperature in the display chamber has risen to a preset high temperature value.

A showcase of the invention of a seventh aspect is characterized in that the above invention further comprises temperature display means for displaying the temperature detected by the temperature sensor, wherein when the control means decreases the illumination intensity of the LED illumination apparatus, the control means displays this effect by the temperature display means.

According to the invention of the first aspect, the showcase in which the inside of the display chamber configured to display the commodities is illuminated by the LED illumination apparatus comprises the person detecting sensor which detects the approaching of the person, and the control means for adjusting the illumination intensity of the LED illumination apparatus. The control means gradually increases the illumination intensity of the LED illumination apparatus in a case where the person detecting sensor detects the approaching of the person. Therefore, as compared with a case where the inside of the display chamber is rapidly illuminated by an LED with a predetermined high illumination intensity, a customer can visually be adapted to light, which can avoid a disadvantage that the customer is dazzled by the light or the like.

Moreover, when the person approaches the showcase, the showcase is illuminated by the LED illumination apparatus with a bright illumination intensity, so that it is possible to suppress the high rise of running cost due to the lighting of the LED illumination apparatus more than necessary.

According to the invention of the second aspect, the showcase in which the inside of the display chamber configured to display the commodities is illuminated by the LED illumination apparatus comprises the person detecting sensor which detects the approaching of the person, the illumination intensity sensor which detects the brightness of the surrounding area, and the control means for adjusting the illumination intensity of the LED illumination apparatus. The control means determines the maximum illumination intensity of the LED illumination apparatus in accordance with the brightness of the surrounding area detected by the illumination intensity sensor, and increases the illumination intensity of the LED illumination apparatus to the maximum illumination intensity in a case where the person detecting sensor detects the approaching of the person. In consequence, the brightness of the showcase obtained by the LED illumination apparatus can be set to the illumination intensity corresponding to the brightness of a surrounding area such as a store where the showcase is installed.

Consequently, the inside of the display chamber can be illuminated by the LED illumination apparatus with an appropriate illumination intensity, and the improvement of an illumination effect can be realized.

According to the invention of the third aspect, in addition to the above inventions, the person detecting sensor includes the power source of the person detecting sensor itself, the contact which detects the approaching of the person to open/close, the power source terminal connected to the power source, and the two contact terminals connected to both the sides of the contact, and the showcase further comprises the terminal plate to which the respective terminals are detachably connected. Therefore, when the terminals of the person detecting sensor are connected to the terminal plate, the illumination control of the LED illumination apparatus can be performed based on the detection of the approaching of the person by the person detecting sensor. In a state in which the terminals of the person detecting sensor are not connected to the terminal plate, when a short circuit line is connected to the terminal plate, the LED illumination apparatus can constantly be energized, or the energization control of the LED illumination apparatus can be performed by an illumination switch for performing the ON/OFF operation of the LED illumination apparatus.

According to the invention of the fourth aspect, the showcase in which the inside of the display chamber configured to display the commodities is illuminated by the LED illumination apparatus comprises the glass door which openably closes the opening of the display chamber, the door opening/closing detection means for detecting the opening/closing of the glass door, and the control means for adjusting the illumination intensity of the LED illumination apparatus. The control means decreases the illumination intensity of the LED illumination apparatus in a case where the door opening/closing detection means detects that the glass door has been opened. In consequence, intense light from the LED illumination apparatus to the front part of the display chamber, which has been blocked by the closed glass door, can be prevented from directly entering customer's eyes or the like at a time when the glass door is opened.

In consequence, even when the customer performs the opening operation of the glass door, it is possible to suppress a disadvantage that the frontward light leaking from the LED illumination apparatus illuminating the inside of the display chamber is emitted to the customer and that the customer feels dazzled.

According to the invention of the fifth aspect, the showcase in which the inside of the display chamber configured to display the commodities is illuminated by the LED illumination apparatus comprises the control means for adjusting the illumination intensity of the LED illumination apparatus, and the control means performs the dark/bright control of the illumination intensity of the LED illumination apparatus for the predetermined period. In consequence, the illumination presentation effect of the LED illumination apparatus can be improved, and the sales effect of the commodities in the display chamber can be improved.

According to the invention of the sixth aspect, the showcase in which the inside of the display chamber configured to display the commodities while cooling the commodities is illuminated by the LED illumination apparatus comprises the temperature sensor which detects the temperature in the display chamber, and the control means for adjusting the illumination intensity of the LED illumination apparatus. The control means decreases the illumination intensity of the LED illumination apparatus in a case where the temperature sensor detects that the temperature in the display chamber has risen to the preset high temperature value. In consequence, heat generated by the LED illumination apparatus itself can be decreased.

Consequently, it is possible to avoid disadvantages that the LED illumination apparatus is lit with the bright illumination intensity in a state in which the inside of the display chamber is not cooled to a predetermined cooling temperature during, for example, a trial operation, maintenance or the like and that the LED illumination apparatus is extraordinarily heated to cause the deterioration and failure of the apparatus itself.

Furthermore, according to the invention of the seventh aspect, in addition to the above invention, the showcase further comprises the temperature display means for displaying the temperature detected by the temperature sensor. When the control means decreases the illumination intensity of the LED illumination apparatus, the control means displays this effect by the temperature display means. In consequence, a user can be informed that control is performed so as to decrease the illumination intensity of the LED illumination apparatus, and it can be recognized that the display chamber is not darkened owing to the failure or the like.

BRIEF DESCRIPTION OF THE DRAWINGS

FIG. 2 is a partially enlarged sectional view of the showcase of FIG. 1;

FIG. 3 is a side view of an illumination apparatus;

FIG. 4 is a partially enlarged view of FIG. 3;

DETAILED DESCRIPTION OF THE PREFERRED EMBODIMENT

Figure 1:
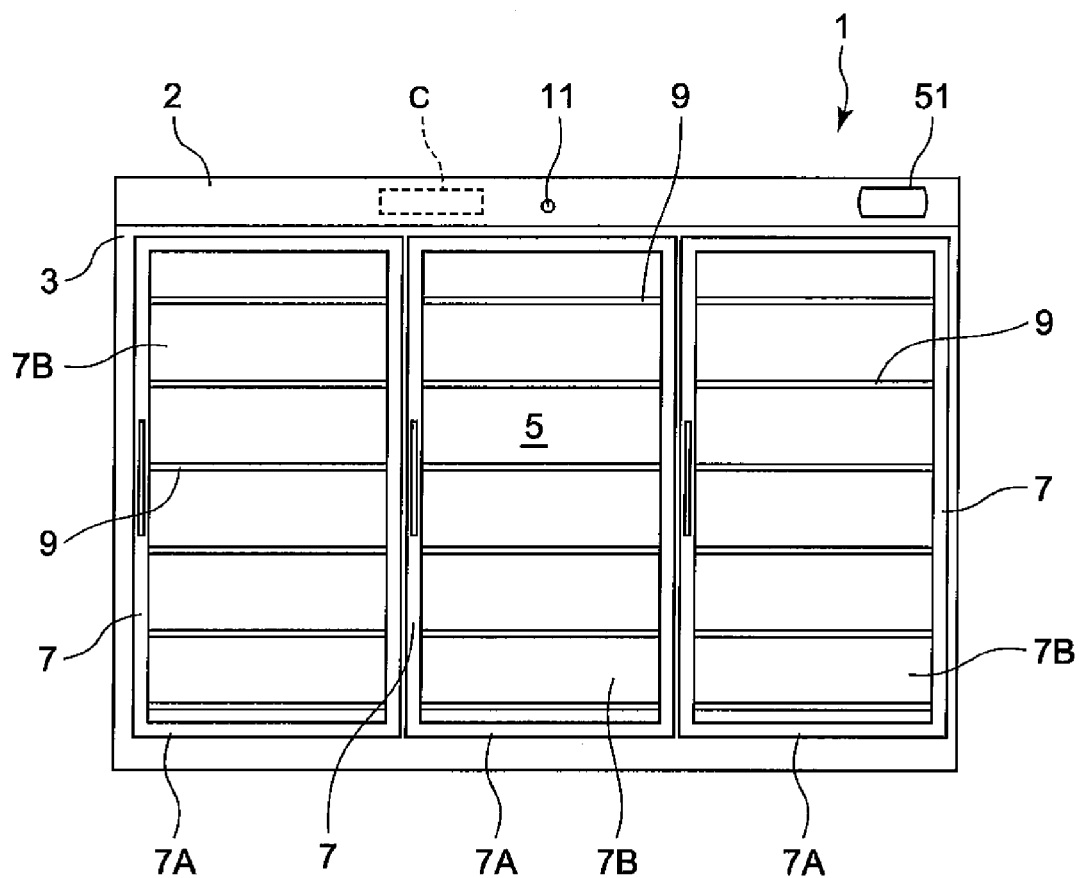
FIG. 1 is a front view of a showcase to which the present invention is applied.
Figure 2:
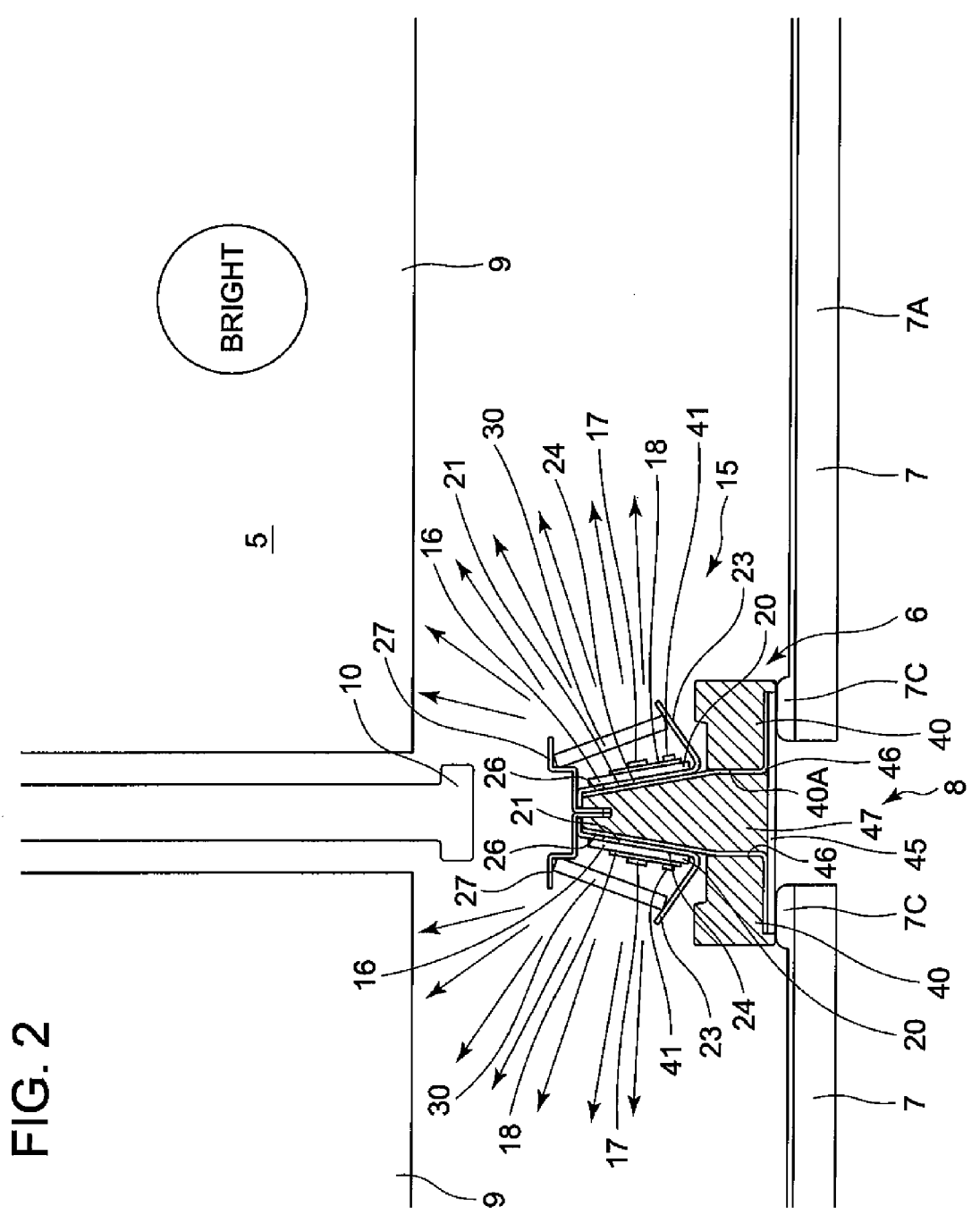

An embodiment of the present invention will hereinafter be described with reference to the drawings. FIG. 1 shows a front view of a showcase 1 to which the present invention is applied, and FIG. 2 shows a partially enlarged sectional view of the showcase 1. The showcase 1 is a low-temperature showcase installed in a supermarket, a convenience store or the like, and a main body is constituted of an insulating box body (an insulating wall) 2 having an open front surface.

This insulating box body 2 is constituted of an outer box 3 having an open front surface and formed of a steel plate; an inner box (not shown) assembled in this outer box 3 with a space being left between the inner box and the outer box, having an open front surface, and formed of a steel plate or a hard resin; and an insulating material with which a space between the outer box 3 and the inner box is foam-filled and which is made of foam polyurethane.

A display chamber 5 is constituted in this inner box, and a front-surface opening 6 of the display chamber 5 across the upper and lower ends of the opening is openably closed by a plurality of (three in the present embodiment) rotary glass doors 7, 7 and 7 through which the inside can be seen. Each of the glass doors 7 is constituted of a frame member 7A constituting a door edge, and a glass plate 7B which is provided in the frame member 7A and through which the inside can be seen, and the rear surface of the frame member 7A is provided with a gasket 7C.

In the edge of the front-surface opening 6 of the insulating box body 2, a plurality of (in this case, the three doors 7 are provided, and hence two) pillars 8 are vertically provided with a predetermined space being left between the pillars. This pillar 8 is constituted of a vertically extending pole-like insulating material 40, a door frame 45 which abuts on the front surface of the insulating material 40 to constitute the front surface of the pillar 8, and an illumination attachment portion 46 provided so as to perform heat exchange between the portion and the door frame 45.

The insulating material 40 is provided with a hollow portion 40A positioned substantially in the center of a transverse section so as to vertically extend. The door frame 45 abuts on the back surface (the gasket 7C) of the glass door 7 which openably closes the front-surface opening 6 of the insulating box body 2, and is constituted of a satisfactorily thermally conductive metal material. Moreover, the illumination attachment portion 46 is constituted of a satisfactorily thermally conductive metal material in the same manner as in the door frame 45. The front end of the portion is provided so as to abut on the rear surface of the door frame 45, and the end of the portion is bent rearwards along the hollow portion 40A of the insulating material 40, and formed so as to extend rearwards as much as a predetermined dimension from the rear wall of the insulating material 40. The rear end of this illumination attachment portion 46 is formed so as to tilt as much as a predetermined angle behind the center of the pillar 8.

It is to be noted that as described later, the illumination attachment portion 46 may be constituted of a plurality of (in this case, two) plate-like members which abut on the inner walls (side surfaces) of the hollow portion 40A of the insulating material 40 so as to efficiently release the heat transmitted via a holding member 21 and transmit the heat to the door frame 45 provided in the heat exchange relation with respect to the illumination attachment portion 46. Moreover, reference numeral 47 in the drawing is an insulating material with which a space surrounded by the illumination attachment portion 46 and the rear surface of the door frame 45 is filled.

According to such a constitution, the gasket 7C on the rear surface of each glass door 7 comes in close contact with the edge of the front-surface opening 6 and the door frame 45 constituting the front surface of the pillar 8, to close the display chamber 5.

Moreover, shelf pillars 10 are vertically provided in the back surface and front part of the display chamber 5, and a plurality of stages of shelves 9 are disposed on the shelf pillars 10. It is to be noted that the shelf pillars 10 are provided with a plurality of engagement holes formed with a predetermined space being left between the holes. When the engagement holes for disposing the shelves 9 are changed, the height positions of the shelves 9 can be changed.

It is to be noted that in the present embodiment, the shelf pillars 10 are provided in the back surface and front part of the display chamber 5 behind the pillars 8. Therefore, the plurality of stages of shelves 9 are disposed behind the glass doors 7.

Furthermore, in the upper part of the display chamber 5, a cooler and a blower constituting a cooling apparatus R (shown only in FIG. 6) are installed. The cooler constitutes the cooling apparatus in which a so-called refrigerant cycle is constituted together with a compressor (not shown), a condenser (not shown) and the like separately installed. When cold air from this cooler is forcibly circulated through the display chamber 5 by the blower, the inside of the display chamber 5 is cooled to a predetermined temperature.

Next, an LED illumination apparatus 15 provided in the display chamber 5 will be described in detail with reference to FIGS. 2 to 5. FIG. 3 shows a side view of the LED illumination apparatus 15, FIG. 4 shows a partially enlarged view of FIG. 3, and FIG. 5 shows a partially enlarged view of a substrate 18, respectively.

In the present embodiment, the LED illumination apparatuses 15 are vertically provided on the inner side from the edge of the opening 6 of the insulating box body 2 constituting the main body, specifically on the front corners of the display chamber 5 and the pillars 8. Each of the LED illumination apparatuses 15 is constituted of a plurality of LED illumination members 16, holding members 21 holding the LED illumination members 16 and attached on the inner side from the edge of the opening 6 of the insulating box body 2, shades 30 and cover members 61.

Figure 5:
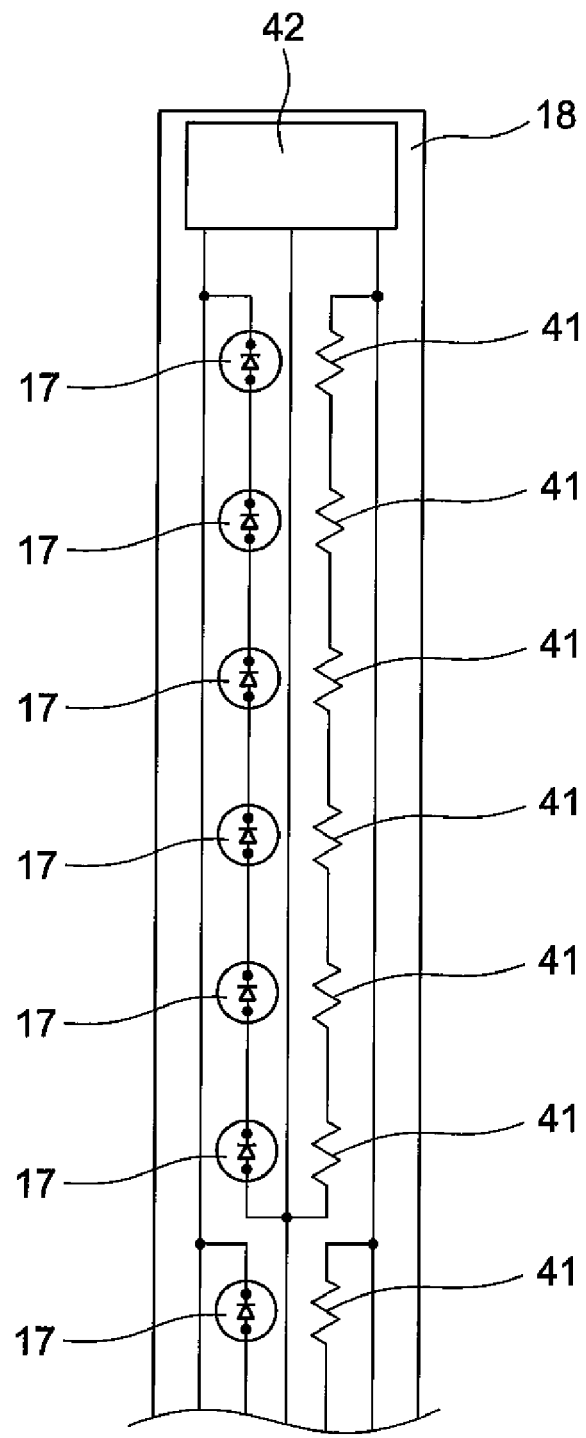
FIG. 5 is a partially enlarged view of a substrate.

As shown in FIG. 5, each of the LED illumination members 16 is constituted of a substrate 18 provided with a plurality of LED elements 17 and a plurality of electric heaters (resistors) 41, and the substrate 18 is fixed to a satisfactorily thermally conductive attachment plate 20. The substrate 18 is constituted so as to extend in a longitudinal direction, and the substrate 18 is provided with the plurality of LED elements 17 with a predetermined space being left between the elements. The LED elements 17 in the present embodiment are chip-type white LED elements.

It is to be noted that the predetermined number of the LED elements 17 regarded as one group are connected to a connector 42 provided in the end of the substrate, and the predetermined number of the electric heaters 41 regarded as one group are similarly connected to the connector 42 in parallel with the LED elements 17. Moreover, the attachment plate 20 is provided with screw holes so that the plate is fixed to the holding member 21 with screws.

The holding member 21 is a satisfactorily thermally conductive metal member constituted so as to vertically extend with respect to the front-surface opening 6 of the insulating box body 2. The holding member 21 has a substantially U-shaped section, and the upper and lower ends of the member are closed by the cover members 61. This holding member 21 abuts on the illumination attachment portion 46 constituting the pillar 8 or the rear surface of the front wall of the insulating box body 2 constituting the front corner, when attached.

That is, a side wall 24 of the holding member 21 which faces the substantially U-shaped opening abuts on the illumination attachment portion 46 of the pillar 8 formed so as to extend rearwards, and is fixed to the portion with screws (not shown). This side wall 24 is provided with a plurality of vertically long extending elongated holes 26 . . . . The elongated holes 26 are holes to be superimposed on the screw holes of the attachment plate 20 of the LED illumination member 16 so that the holding member is fixed with the screws, and the vertical attachment position of the LED illumination member 16 can be changed as much as the length dimension of the elongated holes 26 (the attachment position can be changed in an arrow direction of FIG. 4).

Moreover, the rear wall of the substantially U-shaped holding member 21 is provided with an engagement portion 27 to be engaged with the shade 30, and the front wall of the holding member is provided with a reflective plate portion 23 positioned behind the insulating material 40 of the pillar 8 and bent rearwards as much as a predetermined angle.

The shade 30 is constituted of a light transmitting colorless transparent material for covering the holding member 21 from the outside, and the shade is detachably attached to the holding member 21 with decorative screws or the like.

A procedure for attaching the LED illumination apparatus 15 having such a constitution will be described. First, the holding member 21 is attached on the inner side from the edge of the opening 6 of the insulating box body 2. In the present embodiment, since the LED illumination apparatuses 15 are positioned on both sides of each glass door 7, the holding members are attached to both front corners of the display chamber 5 and the rearward extending illumination attachment portions 46 of the pillars 8. It is to be noted that since the pillar 8 is positioned between the glass doors 7 and 7, two holding members 21 are attached via the illumination attachment portions 46 provided on the pillar 8 so that the back surfaces of the side walls 24 face each other. Moreover, the LED illumination apparatuses 15 provided in the front corners are attached so that irradiation light from the LED elements 17 is emitted toward the inside of the display chamber 5.

Then, the attachment plates 20 provided with the LED elements 17 are attached to the side walls 24 of the holding members 21, and the screw holes of the attachment plates 20 are superimposed on the elongated holes 26 to fix the attachment plates with the screws. In consequence, the substrate 18 of the LED illumination apparatus 15 is provided on the surface of the door frame 45 on the display chamber 5 side in a heat exchange relation via the attachment plate 20 constituted of the satisfactorily thermally conductive material and the side wall 24 of the holding member 21. Moreover, since the illumination attachment portion 46 of the pillar 8 fixed to the side wall 24 is formed so as to tilt as much as the predetermined angle behind the center of the pillar 8 as described above, the LED elements 17 of the LED illumination apparatus 15 are provided on the display chamber 5 side slightly from a position parallel to the front-surface opening 6.

It is to be noted that in the present embodiment, the plurality of (four) LED illumination members 16 described above are attached to the holding member 21. However, the LED illumination apparatus 15 may be constituted of the single LED illumination member 16 constituted across the upper and lower ends of the front-surface opening 6, and the vertical position of the apparatus may be changed in accordance with the elongated holes 26 for the attachment. When the apparatus is constituted of a plurality of LED illumination members 16 as in the present embodiment, production cost can be decreased, and handleability can be improved.

Moreover, the reflective plate portion 23 of the holding member 21 is positioned on the glass door 7 side of the LED illumination member 16. Furthermore, on the opening side of the holding member 21, the shade 30 for covering the LED illumination member 16 from the outside is attached. It is to be noted that the shade 30 is detachably engaged with the engagement portion 27 formed on the opening side of the holding member 21 and the end of the reflective plate portion 23. In consequence, the shade 30 is attached so that the shade is directed to the inside of the display chamber 5 slightly from a position substantially parallel to the glass door 7.

Figure 6:
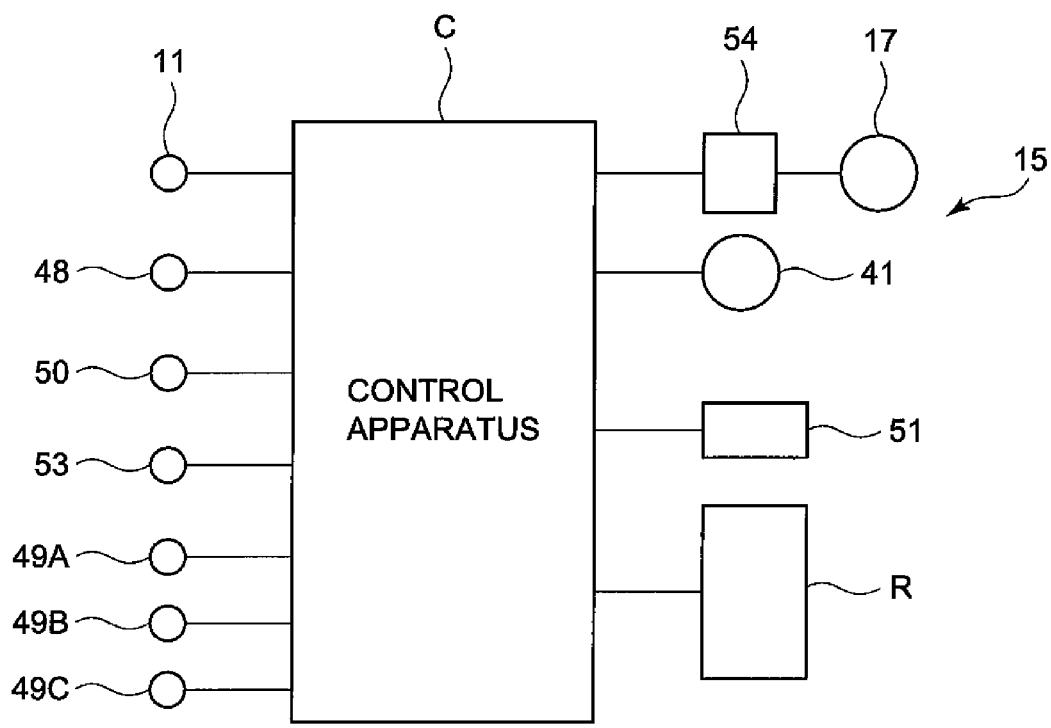
FIG. 6 is an electric block diagram of a control apparatus.

Next, a control apparatus C of the showcase 1 of the present embodiment will be described with reference to FIG. 6. The control apparatus C of the present embodiment is constituted of a versatile microcomputer. This control apparatus on an input side is connected to an illumination switch 53 of the LED illumination apparatus 15, a person detecting sensor 11 which detects that a person has approached the showcase 1, an illumination intensity sensor 48 for detecting an illumination intensity (the surrounding illumination intensity) in the store or the like where the showcase 1 is installed, a door opening/closing switch (door opening/closing detection means) 49 for detecting the opening/closing of each glass door 7, and an in-chamber temperature sensor 50 for detecting a temperature in the display chamber 5.

The illumination intensity sensor 48 is provided on the outer surface of the main body 2, for example, the top surface of the main body as a position which is not easily influenced by the shade of a peripheral device. As to the door opening/closing switch 49, since the plurality of (three) glass doors 7 are provided in the present embodiment, door opening/closing switches 49A, 49B and 49C corresponding to the glass doors 7 . . . are provided in order from the left glass door 7 as one faces the front surface. It is to be noted that the person detecting sensor 11 will be described later.

Moreover, the control apparatus C on an output side is connected to the cooling apparatus R constituted of the compressor, the blower and the like as described above, and is also connected to the LED elements 17 and the electric heaters 41 of the LED illumination apparatus 15, respectively. It is to be noted that the LED elements 17 are connected to the control apparatus C via an inverter 54. In addition, the control apparatus C on the output side is connected to a temperature display section (temperature display means) 51 provided on the front surface of the upper part of the main body 2 so as to display the temperature in the display chamber 5 or the present mode.

Figure 7:
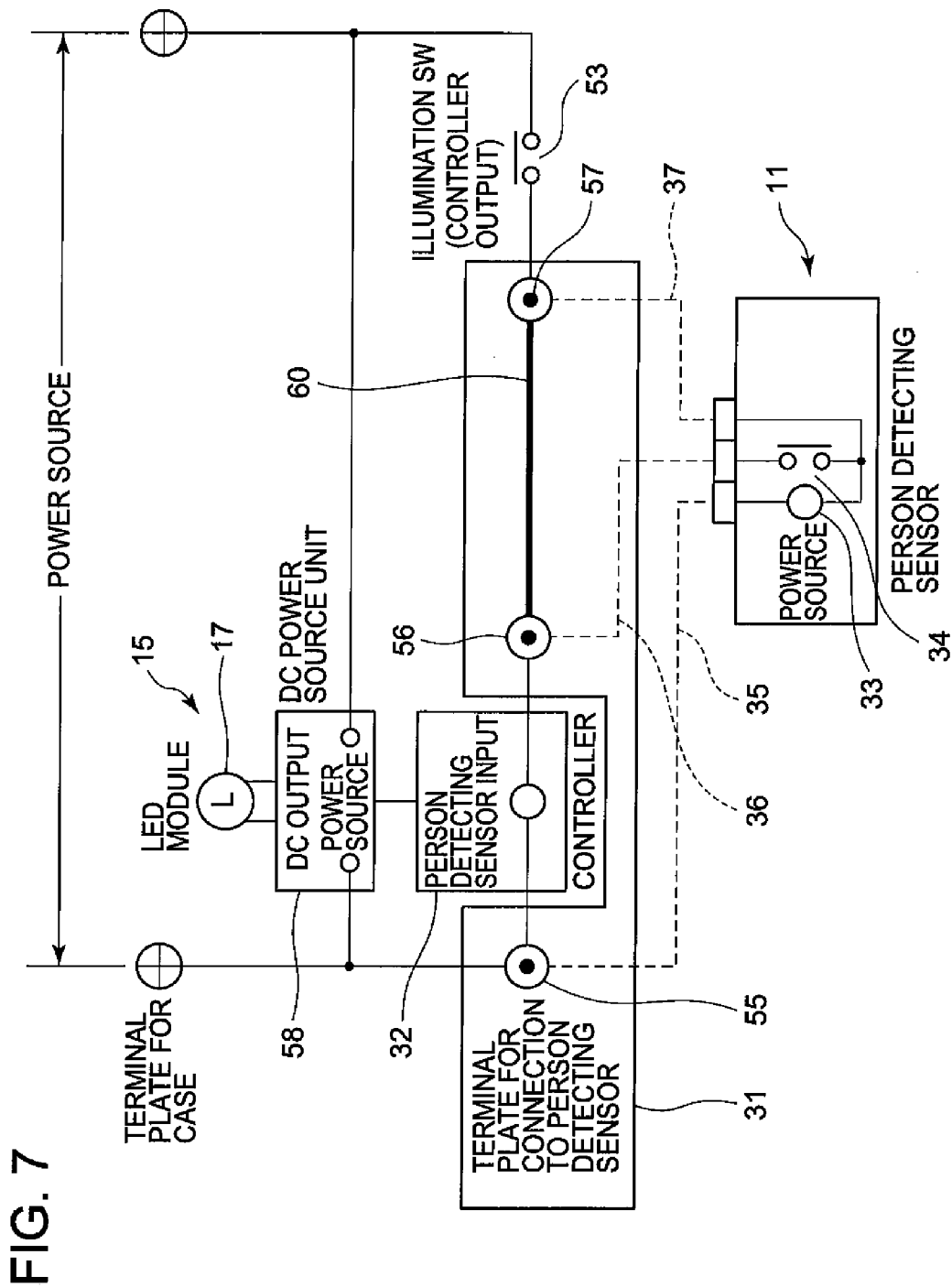
FIG. 7 is an electric circuit diagram showing the connection of a person detecting sensor.

Here, as shown in an electric circuit diagram of FIG. 7, the person detecting sensor 11 is connected to an LED illumination control section 32 constituting the control apparatus C via a terminal plate 31 for connection to the person detecting sensor. The person detecting sensor 11 is provided on, for example, the front surface of the center of the upper part of the insulating box body 2 or the like, and has therein a power source 33 of the person detecting sensor itself, and a person detecting contact 34 which detects the approaching of the person to open or close. The power source 33 is connected to a power source terminal 35, and both sides of the person detecting contact 34 are connected to an output contact terminal 36 and a common contact terminal 37.

On the other hand, the terminal plate 31 provided in the showcase 1 main body is provided with a first connecting portion 55, a second connecting portion 56 and a third connecting portion 57. The first connecting portion 55 is connected to the power source on the side of the showcase 1 main body and the LED illumination control section 32, the second connecting portion 56 is connected to the LED illumination control section 32, and the third connecting portion 57 is connected to the power source on the side of the showcase 1 main body via the illumination switch 53 provided in the showcase 1 main body. Moreover, the power source on the side of the showcase 1 main body is connected to the LED elements 17 of the LED illumination apparatus 15 via a DC power source unit 58 in parallel with the LED illumination control section 32.

According to such a constitution, the power source terminal 35 of the person detecting sensor 11 is connected to the first connecting portion 55 of the terminal plate 31, the output contact terminal 36 of the person detecting sensor 11 is connected to the second connecting portion 56 of the terminal plate 31, and the common contact terminal 37 of the person detecting sensor 11 is connected to the third connecting portion 57 of the terminal plate 31. Consequently, in a state in which the illumination switch 53 on the main body 2 side is turned on, when the person detecting contact 34 of the person detecting sensor 11 turns ON/OFF, the energization of the LED illumination control section 32 of the LED illumination apparatus 15 can be controlled. In consequence, the ON/OFF control of the LED illumination apparatus 15 can be performed based on the turning ON/OFF of the person detecting sensor 11. It is to be noted that when the person detecting sensor 11 is turned on and then turned off, the LED illumination control section 32 turns off the LED illumination apparatus 15 after delay of a predetermined time of, for example, several ten seconds from a time when the person detecting sensor 11 is turned off.

It is to be noted that in a state in which the terminals 35, 36 and 37 of the person detecting sensor 11 are not connected to the terminal plate 31, that is, in a state in which the person detecting sensor 11 is detached, as shown in FIG. 7, a short circuit line 60 is connected between the second connecting portion 56 and the third connecting portion 57 of the terminal plate 31 to cause short-circuiting, whereby the ON/OFF control of the LED illumination apparatus 15 can be performed by the ON/OFF control of the illumination switch 53 provided in the main body 2. Therefore, when the person detecting sensor 11 is connected, the ON/OFF control of the LED illumination apparatus 15 can be performed by the ON/OFF control of the person detecting contact 34 provided in the person detecting sensor 11. Moreover, when the person detecting sensor 11 is not connected, the short circuit line 60 causes the short circuit of each connecting portion of the terminal plate 31, so that the ON/OFF control of the LED illumination apparatus 15 can be performed only by the illumination switch 53 on the main body 2 side.

The illumination control of the LED illumination apparatus 15 of the showcase 1 in the present embodiment having the above constitution will be described. First, the control apparatus C detects an illumination intensity in the store (the surrounding area) where the showcase 1 is installed by the illumination intensity sensor 48, and determines the maximum illumination intensity of the LED illumination apparatus 15 provided in the display chamber 5 based on the illumination intensity. In the present embodiment, the maximum illumination intensity is determined so that the inside of the display chamber 5 is brightened as much as a predetermined illumination intensity as compared with the surrounding illumination intensity detected by the illumination intensity sensor 48.

Moreover, in a state in which the person detecting sensor 11 is connected to the terminal plate 31 as described above, the control apparatus C energizes the LED elements 17 of the LED illumination apparatus 15 by the LED illumination control section 32 based on the detection output of the person detecting sensor 11 indicating that the person has approached the showcase 1, that is, the person has entered a predetermined range of a distance from the showcase 1. Therefore, in principle, the LED elements 17 of each LED illumination apparatus 15 are not energized and are turned off in a state in which the person detecting sensor 11 does not detect the approaching of the person.

At this time, based on the detection of the approaching of the person by the person detecting sensor 11, the LED illumination control section 32 of the control apparatus C controls a current/voltage for energizing the LED elements 17 of the LED illumination apparatus 15 so as to gradually increase the illumination intensity from a state in which the elements are turned off. Finally, the illumination intensity is increased to the maximum illumination intensity determined based on the surrounding illumination intensity as described above.

In consequence, the illumination intensity of each LED element 17 for illuminating the inside of the display chamber 5 is gradually increased based on the detection of the approaching of the person by the person detecting sensor 11 provided in the showcase 1. Therefore, as compared with a case where the display chamber is rapidly illuminated by the LED elements 17 with a predetermined high illumination intensity, a customer can gradually be adapted to light, which can avoid a disadvantage that the customer is dazzled by the light or the like.

Here, the light from the LED elements 17 of the LED illumination members 16 fixed to the side walls 24 of the holding members 21 is emitted in a lateral direction (substantially parallel to the glass door 7) behind both the side portions of the glass door 7. It is to be noted that in the present embodiment, the LED elements are formed so as to slightly tilt rearwards (toward the display chamber 5 side) with respect to the edge of the opening 6 of the insulating box body 2 as described above. In consequence, the light from the LED illumination apparatus 15 is emitted toward the front parts of the shelves 9 disposed in the display chamber 5. Therefore, the light having high directivity can be emitted from the LED elements 17 to the front parts of the shelves 9. In consequence, the commodities on the shelves 9, especially on the foremost parts of the shelves can evenly satisfactorily be illuminated, and the front surfaces of the commodities can effectively be illuminated. Consequently, the illumination effect and display effect of the commodities can be improved.

Moreover, in this case, the LED illumination control section 32 of the control apparatus C gradually increases the illumination intensity from the state in which the LED elements 17 are turned off, and the section illuminates the inside of the display chamber 5 with the maximum illumination intensity determined based on the surrounding illumination intensity. Therefore, the brightness of each LED element 17 of the LED illumination apparatus 15 of the showcase 1 can be determined in accordance with the brightness of a surrounding area such as the store where the showcase 1 is installed, and incompatibility with the surrounding illumination can be avoided.

In consequence, the inside of the display chamber 5 can effectively be illuminated by the LED illumination apparatus 15 with an appropriate illumination intensity, and the improvement of the illumination effect can be realized.

Furthermore, based on the non-detection of the approaching of the person by the person detecting sensor 11, after the elapse of a predetermined time of, for example, several ten seconds from a non-detection time, the LED illumination control section 32 of the control apparatus C stops the energization of the LED elements 17 of the LED illumination apparatus 15 to turn off the LED elements.

Thus, in the control apparatus C, when the person approaches the showcase 1, the showcase is illuminated by the LED illumination apparatus 15 with a bright illumination intensity, so that it is possible to suppress the high rise of running cost due to the lighting of the LED illumination apparatus 15 more than necessary.

On the other hand, the LED illumination control section 32 of the control apparatus C executes presenting illumination in a state in which the LED illumination apparatus 15 is lit while the person detecting sensor 11 detects the approaching of the person as described above, or for a predetermined time after the non-detection of the approaching of the person.

In this presenting illumination, the control apparatus C controls the current/voltage for energizing the LED elements 17 of the LED illumination apparatus 15 to perform the bright/dark control of the illumination intensity of the LED illumination apparatus 15 periodically between the maximum illumination intensity and the turned-off state. It is to be noted that in the present embodiment, the LED elements are turned off as a dark state, but this is not restrictive, and the dark illumination intensity may have a predetermined minimum illumination intensity (a state in which the LED elements are not turned off).

In consequence, the illumination presentation effect of the LED illumination apparatus 15 can be improved, and the sales effect of the commodities in the display chamber 5 can be improved.

On the other hand, in a case where one of the glass doors 7 is opened in a state in which the LED illumination apparatus 15 is lit as described above, based on the detection of the door opening by the door opening/closing switch 49 (49A to 49C) which detects the opening/closing of the door 7, the control apparatus C controls the current/voltage for energizing the LED elements 17 of the LED illumination apparatus 15 illuminating the display chamber 5 part closed by the corresponding glass door 7 to decrease the illumination intensity of the LED illumination apparatus 15. Moreover, based on the door opening/closing switch 49 detecting that the corresponding glass door 7 has been closed, the control apparatus C lights the LED illumination apparatus 15 with an original illumination intensity, that is, the maximum illumination intensity in this case.

For example, in a case where the leftmost glass door 7 as one faces the front surface is opened, the door opening/closing switch 49A detects that the glass door 7 has been opened. Based on this detection, the control apparatus C decreases the illumination intensities of the LED illumination apparatuses 15 provided for the glass door 7, specifically, the LED illumination apparatus 15 provided in the left front corner of the display chamber 5 as one faces the front surface, and the LED illumination apparatus 15 provided on a side opposite to the above LED illumination apparatus 15 via the glass door 7, that is, the LED illumination apparatus 15 provided on the left side of the pillar 8 positioned on the left side as one faces the front surface.

Consequently, in a case where the door opening/closing switch 49 detects that the glass door 7 has been opened, the control apparatus C decreases the illumination intensity of the LED illumination apparatus 15. Therefore, the intense light from the LED illumination apparatus 15 to the front part of the display chamber 5, which has been blocked by the closed glass door 7, can be prevented from directly entering customer's eyes or the like at a time when the glass door 7 is opened.

In consequence, even when the customer performs the opening operation of the glass door 7, it is possible to suppress a disadvantage that the frontward light leaking from the LEO illumination apparatus 15 illuminating the inside of the display chamber 5 is emitted to the customer and that the customer feels dazzled.

In this case, the control apparatus C may gradually or immediately perform the illumination intensity change accompanying the opening/closing operation of the glass door 7. When the illumination intensity is gradually changed, the incompatibility with the presenting illumination of the whole showcase 1 can be eased. On the other hand, when the illumination intensity is immediately changed, it is possible to early eliminate a disadvantage that the light to the front part of the display chamber 5 which has been blocked by the glass door 7 enters the customer's eyes at a time when the glass door 7 is opened.

Next, there will be described the illumination intensity control of the LED illumination apparatus 15 in a trial operation mode during the trial operation or maintenance of the showcase 1, or in a non-cooling mode which does not involve a cooling operation. In principle, the control apparatus C executes the illumination intensity control of the LED illumination apparatus 15 as described above. At this time, to protect the LED elements 17 of the LED illumination apparatus 15 which generate heat when energized, the control apparatus C beforehand holds, as a high temperature value, an in-chamber temperature supposed as a temperature having a high possibility that the LED illumination apparatus 15 itself might remarkably incur deterioration, failure or the like. It is to be noted that the high temperature value can arbitrarily be set.

Moreover, in a case where based on the temperature detected by the in-chamber temperature sensor 50 installed in the display chamber 5, it is detected that the temperature has reached the high temperature value, the control apparatus C controls the current/voltage for energizing the LED elements 17 of the LED illumination apparatus 15 to decrease the illumination intensity.

In the present embodiment, the illumination intensity is decreased to an illumination intensity of about 50% of the maximum illumination intensity. It is to be noted that the illumination intensity is not limited to this example, and based on the detection of the high temperature value, the LED illumination apparatus 15 may be turned off, or the illumination intensity of the LED illumination apparatus 15 may gradually be decreased.

In consequence, the heat generated from the energized LED elements 17 themselves of the LED illumination apparatus 15 can be decreased. Therefore, it is possible to avoid a disadvantage that the LED illumination apparatus 15 is lit with the bright illumination intensity in a state in which the inside of the display chamber 5 is not cooled to a predetermined cooling temperature in the trial operation mode or the non-cooling mode to abnormally heat the LED elements 17 of the LED illumination apparatus 15 and cause the deterioration or failure of the elements themselves.

Moreover, when the control is performed so as to decrease the illumination intensity of (or turn off) the LED illumination apparatus 15 based on the detection of the high temperature value, the control apparatus C displays the trial operation mode or the non-cooling mode at present by the temperature display section 51 provided in the main body 2 of the showcase 1.

In consequence, at present, a user can be informed that the control is performed so as to decrease the illumination intensity of the LED illumination apparatus 15, and it can be recognized that the display chamber is not darkened owing to the failure or the like.

Even when the illumination intensity of the LED illumination apparatus 15 is controlled as described above, each LED element 17 constituting the LED illumination apparatus 15 has a high durability against turning ON/OFF as compared with a fluorescent lamp heretofore used as the illumination apparatus, and the element can secure a predetermined illumination intensity following ON/OFF control even under an environment at a low temperature, so that appropriate illumination control can be realized.

Moreover, the LED element 17 has a remarkably long life as compared with the fluorescent lamp, and hence can obviate the need for an illumination replacing operation. In consequence, the need for a laborious operation such as the constant storage of a replacing component or the disposal of wastes discharged due to the replacement can be obviated.

On the other hand, when the LED elements 17 are energized by the control of the current/voltage for energizing the LED elements 17 of each LED illumination apparatus 15 as described above, the substrate 18 provided with the LED elements 17 generates heat. As the energization is large, the heat increases. Therefore, when the inside of the display chamber 5 is illuminated by the LED elements 17, the heat is transmitted to the satisfactorily thermally conductive attachment plate 20 to which the substrate 18 is attached and the side wall 24 of the satisfactorily thermally conductive holding member 21 to which the attachment plate 20 is attached.

Moreover, since this side wall 24 is provided so as to abut on the door frame 45 made of the metal, the heat generated by the LED illumination apparatus 15 is transmitted to the door frame 45 provided in a heat exchange relation. Since the door frame 45 comes in contact with the outside, dew condensation is easily caused by a difference between the outside air temperature and the temperature in the display chamber 5. However, the door frame 45 can be heated by the heat generated by the LED illumination apparatus 15, and hence the dew condensation of the door frame 45 can effectively be suppressed.

In consequence, it is possible to effectively avoid a disadvantage that the dew condensation occurs in the door frame 45 to wet the inside of the display chamber 5, the installation floor surface of the showcase 1 or the like. Moreover, it is possible to avoid a disadvantage that the dew flies and scatters by the opening/closing operation of the glass door 7.

Moreover, when the heat generated by the energization of the LED elements 17 is used in heating the door frame 45, the heat can smoothly be released from the substrate 18 provided with the LED elements 17, and the deterioration or failure of the LED illumination apparatus 15 can be prevented or suppressed. Furthermore, the deterioration of a cooling efficiency in the display chamber 5 can thus be decreased.

It is to be noted that in the above-mentioned illumination (illumination intensity) control, when the inside of the display chamber 5 is not illuminated by the LED illumination apparatus 15, the heat generated by the energization of the LED elements 17 cannot be used in heating the door frame 45.

Therefore, in the present embodiment, when the LED elements 17 of the LED illumination apparatus 15 are not energized, the control apparatus C energizes the electric heaters 41 provided on the substrate 18 together with the LED elements 17.

In consequence, even when the LED illumination apparatus 15 is turned off and the door frame 45 cannot be heated by the heat generated by the apparatus itself, the heat of the electric heaters 41 generated by the energization can be transmitted to the surface of the door frame 45 on the display chamber 5 side to effectively suppress the dew condensation of the door frame 45.

Therefore, even when the LED illumination apparatus 15 illuminates the inside of the display chamber or is turned off, the LED elements 17 or the electric heaters 41 constituting the LED illumination apparatus 15 are energized. Consequently, unlike the conventional example, an electric heater does not have to be especially embedded in the door frame 45. In particular, since the surface of the door frame 45 on the glass door 7 side is heated by the energization of the LED elements 17, the need for the separate energization of the electric heater is obviated during the illumination by the LED illumination apparatus 15, and the running cost can be decreased.

Figure 8:
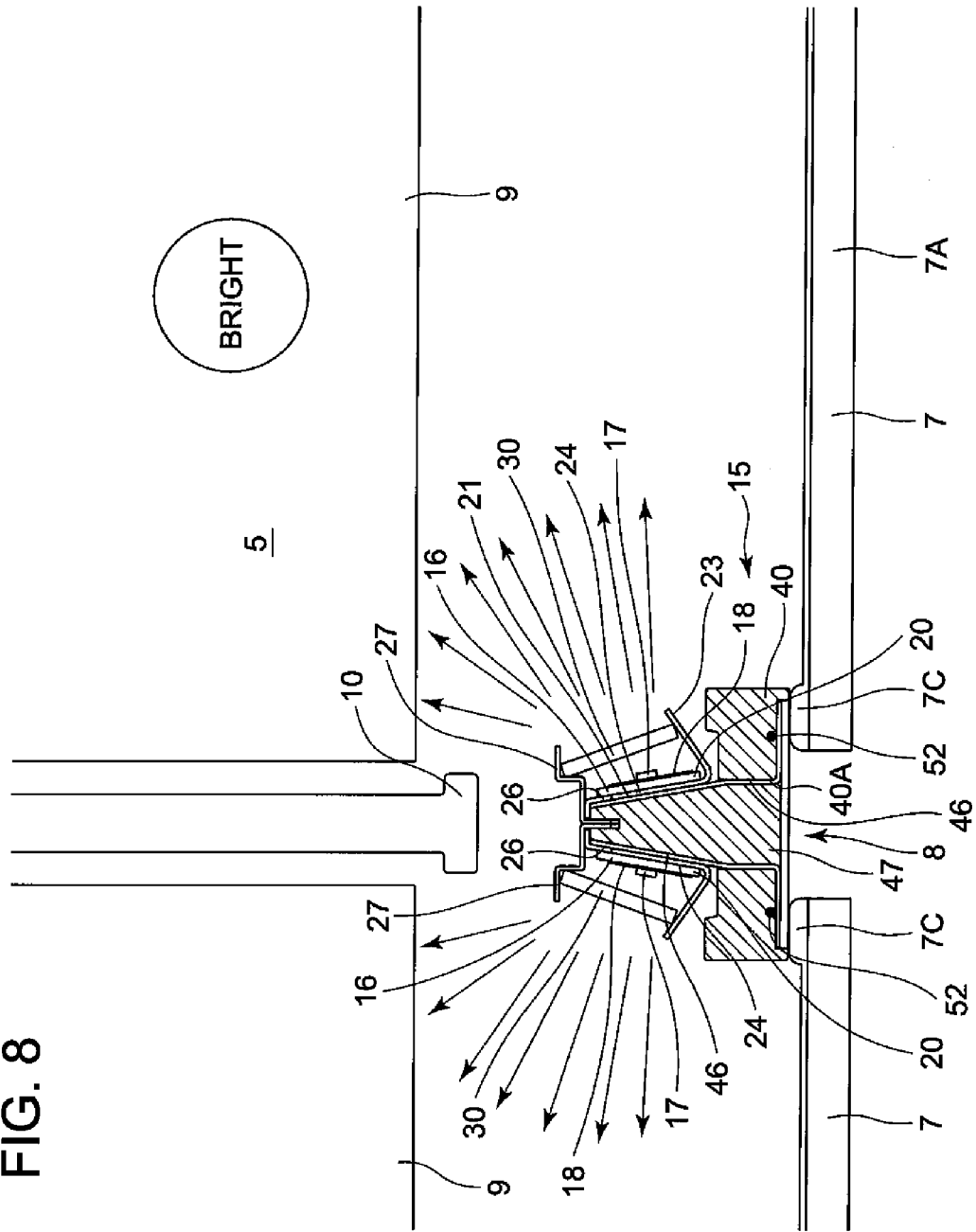
FIG. 8 is a partially enlarged sectional view of a showcase as another embodiment.

It is to be noted that in the above present embodiment, the electric heaters 41 for heating the door frame 45 are provided on the substrate 18 constituting the LED illumination apparatus 15 to heat the surface of the door frame 45 on the display chamber 5 side provided in a heat exchange relation with respect to the substrate 18, but this is not restrictive, and a constitution shown in FIG. 8 may be used. That is, electric heaters 41 are not provided on a substrate 18 constituting an LED illumination apparatus 15, LED elements 17 only may be arranged on the substrate, and electric heaters 52 may be embedded in the back surface of a door frame 45 constituting a pillar 8. The electric heaters 52 heat the surface of the door frame 45 on a glass door 7 side by energization, and a control apparatus C energizes the electric heaters accompanying the stop of the energization of the LED elements 17 of the LED illumination apparatus 15.

In consequence, when the LED illumination apparatus 15 is turned off, the electric heaters 52 for heating the surface of the door frame 45 on the glass door 7 side can be energized to effectively suppress the dew condensation of the door frame 45.

What is claimed is:

1. A showcase in which the inside of a display chamber configured to display commodities is illuminated by an LED illumination apparatus, comprising:
    a person detecting sensor which detects the approaching of any person;
    an illumination intensity sensor which detects an illumination intensity of an area; and
    control means for adjusting the illumination intensity of the LED illumination apparatus,
    wherein the control means gradually increases the illumination intensity of the LED illumination apparatus in dependence upon the illumination intensity of the area, in a case where the person detecting sensor detects the approaching of the person.

2. The showcase according to claim 1, wherein the person detecting sensor includes a power source of the person detecting sensor itself, a contact which detects the approaching of the person to open/close, a power source terminal connected to the power source, and two contact terminals connected to both sides of the contact, the showcase further comprising: a terminal plate to which the respective terminals are detachably connected.

3. A showcase in which the inside of a display chamber configured to display commodities while cooling the commodities is illuminated by an LED illumination apparatus, comprising:
- a temperature sensor which detects a temperature in the display chamber; and
- control means for adjusting the illumination intensity of the LED illumination apparatus,
- wherein the control means decreases the illumination intensity of the LED illumination apparatus to about 50% of the maximum illumination intensity or decreases the illumination intensity of the LED illumination apparatus gradually in a case where the temperature sensor detects that the temperature in the display chamber has risen to a preset high temperature value.

4. A showcase in which the inside of a display chamber configured to display commodities while cooling the commodities is illuminated by an LED illumination apparatus, comprising:
- a temperature sensor which detects a temperature in the display chamber;
- control means for adjusting the illumination intensity of the LED illumination apparatus,
- wherein the control means decreases the illumination intensity of the LED illumination apparatus in a case where the temperature sensor detects that the temperature in the display chamber has risen to a preset high temperature value; and
- temperature display means for displaying the temperature detected by the temperature sensor,
- wherein when the control means decreases the illumination intensity of the LED illumination apparatus, the control means displays this effect by the temperature display means.

* * * * *